(12) United States Patent
Ohlig et al.

(10) Patent No.: US 7,127,891 B2
(45) Date of Patent: Oct. 31, 2006

(54) BRAKE POWER GENERATOR FOR A HYDRAULIC MOTOR VEHICLE BRAKE SYSTEM, AND HYDRAULIC MOTOR VEHICLE BRAKE SYSTEM

(75) Inventors: Benedikt Ohlig, Vallendar (DE); Wilfried Giering, Mendig (DE); Erwin Michels, Kail (DE); Herbert Steinheuer, Bad Neuenahr (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/224,474

(22) Filed: Sep. 12, 2005

(65) Prior Publication Data

US 2006/0048512 A1 Mar. 9, 2006

Related U.S. Application Data

(63) Continuation of application No. PCT/EP04/02459, filed on Mar. 10, 2004.

(30) Foreign Application Priority Data

Mar. 13, 2003 (DE) ................. 103 11 060

(51) Int. Cl.
*B60T 13/00* (2006.01)
*F15B 7/00* (2006.01)

(52) U.S. Cl. ............... 60/547.1; 60/545; 91/363 A (58) Field of Classification Search ............. 60/545, 60/547.1, 550, 562; 91/363 A, 369.1
See application file for complete search history.

(56) References Cited

U.S. PATENT DOCUMENTS

| | | | | |
|---|---|---|---|---|
| 3,515,441 A | * | 6/1970 | Stein ................. | 60/547.1 |
| 4,603,918 A | * | 8/1986 | Leiber et al. .......... | 60/547.1 |
| 4,620,750 A | * | 11/1986 | Leiber ................ | 60/545 |
| 4,653,813 A | * | 3/1987 | Burgdorf .............. | 60/545 |
| 4,667,476 A | | 5/1987 | Takata et al. | |
| 4,703,978 A | * | 11/1987 | Belart et al. .......... | 60/547.1 |
| 5,421,643 A | | 6/1995 | Kircher et al. | |
| 5,531,509 A | * | 7/1996 | Kellner et al. ......... | 60/545 |
| 6,233,932 B1 | | 5/2001 | Heibel et al. | |
| 6,322,162 B1 | * | 11/2001 | Mohr ................. | 60/547.1 |
| 6,494,546 B1 | | 12/2002 | Feigel | |
| 6,729,450 B1 | * | 5/2004 | Albert et al. .......... | 60/545 |

FOREIGN PATENT DOCUMENTS

| | | |
|---|---|---|
| DE | 32 36 582 | 4/1984 |
| DE | 36 00 729 | 7/1986 |

(Continued)

*Primary Examiner*—Edward K. Look
*Assistant Examiner*—Michael Leslie
(74) *Attorney, Agent, or Firm*—MacMillan, Sobanski & Todd, LLC (57) ABSTRACT

A braking force generator includes a primary piston displaceable in a housing to enclose a primary pressure chamber. A pedal simulation device is connected to the force input element. A pedal actuation detection device detects the pedal actuation and an actuating force booster stage. During normal operation the force input element is mechanically uncoupled from the primary piston, and the actuating force booster stage exerts an actuating force on the primary piston. In the event of failure of the actuating force booster stage the force input element is workingly connectable to the primary piston such that a contact extension extends from the primary piston towards the force input element. During normal operation the contact extension is held by a release gap at a distance from the force input element and in the event of failure of the actuating force booster stage the force input element after travelling the release gap is applied workingly against the contact extension.

23 Claims, 4 Drawing Sheets

FOREIGN PATENT DOCUMENTS

| | | |
|---|---|---|
| DE | 42 39 386 | 5/1994 |
| DE | 196 32 035 | 2/1998 |
| EP | 1 003 658 | 5/2000 |
| EP | 1 070 006 | 1/2001 |

* cited by examiner

BRAKE POWER GENERATOR FOR A HYDRAULIC MOTOR VEHICLE BRAKE SYSTEM, AND HYDRAULIC MOTOR VEHICLE BRAKE SYSTEM

CROSS REFERENCE TO RELATED APPLICATIONS

This application is a continuation of International Application No. PCT/EP2004/002459 filed Mar. 10, 2004, the disclosures of which are incorporated herein by reference, and which claimed priority to German Patent Application No. 103 11 060.7 filed Mar. 13, 2003, the disclosures of which are incorporated herein by reference.

BACKGROUND OF THE INVENTION

The invention relates to a braking force generator for a hydraulic brake system comprising a force input element, which is connected to a brake pedal, a housing and a primary piston displaceable in the housing, wherein the primary piston together with the housing encloses a primary pressure chamber for generation of a hydraulic brake pressure, a pedal simulation device connected to the force input element, a pedal actuation detection device for detecting a pedal actuation and an actuating force booster stage for exerting an actuating force on the primary piston, wherein during normal operation the force input element is mechanically uncoupled from the primary piston and the actuating force booster stage in accordance with the detected pedal actuation exerts an actuating force on the primary piston and wherein in the event of failure of the actuating force booster stage the force input element is workingly connectable to the primary piston.

Such braking force generators are known from the background art and used in electrohydraulic brake systems, in which during normal operation a brake pedal to be actuated is completely mechanically uncoupled from the downstream brake system. This mechanical uncoupling of the brake pedal from the actual brake system has the advantage that the driver request according to a pedal actuation is detected by sensor equipment and in accordance with the detected pedal actuation the remaining brake system is electronically controlled. It is then possible to take into account further parameters characterizing the instantaneous state of the vehicle.

In such brake systems, however, in case electronic control or servo-power assistance components fail, it is a requirement to provide an emergency operating mode, in which even without the assistance of the actuating force booster stage, in particular without hydraulic or pneumatic servo-power assistance or without electronic sensor elements, a braking operation may be carried out. In such an emergency operating mode, a mechanical coupling between the brake pedal and the hydraulic brake circuit is then to be established relatively quickly in order by means of the direct mechanical coupling to be able to act upon the hydraulic brake system and initiate a braking operation.

From an embodiment (FIGS. 2 and 3) of the species-defining EP 1 003 658 B1, and corresponding U.S. Pat. No. 6,233,932, both of which are incorporated by reference herein, a braking force generator of the initially described type is known, which provides both the previously described normal operating mode and the emergency operating mode. During normal operation, a pedal actuation is detected by means of the pedal simulation device and in accordance with the detected pedal actuation an actuating force booster stage is activated, which then acts upon the actual hydraulic brake system. The uncoupling of brake pedal and primary piston of the hydraulic brake system is achieved by means of a non-self-locking threaded connection. For this purpose, a threaded sleeve rotates freely on a threaded bolt and hence enables a non-working linear movement between the force input element connected to the brake pedal and the primary piston. During emergency brake operation, i.e. in the event of failure of the actuating force booster stage, the threaded sleeve upon pedal actuation is displaced into a locking position, so that the threaded bolt coupled to the primary piston is no longer able to move freely relative to the threaded sleeve. Rather, the result is an interlocking of threaded sleeve and threaded bolt and ultimately a working connection between the force input element and the primary piston. The solution according to EP 1 003 658 B1 admittedly has the desired effect of an extensive mechanical uncoupling of force input element and primary piston during normal operation and moreover presents a rapid response characteristic in the case of the emergency operating mode, but its construction is relatively complicated and entails exact and therefore laborious manufacture, which adds to the cost thereof.

EP 1 003 658 B1 shows a further embodiment (FIG. 1), which, whilst being of a simple construction, has the drawback that in the emergency operating situation it responds only after a relatively long pedal stroke. A similar system is known from EP 1 070 006 B1, and corresponding U.S. Pat. No. 6,494,546, both of which are incorporated by reference herein. In this system also, the force input element in the emergency operating situation has to travel a relatively long distance before a braking effect is achieved. In other words, with this background art, in an emergency operating situation the brake pedal has to be pressed down relatively far before a braking effect is achieved.

From DE 36 00 729, and corresponding U.S. Pat. No. 4,667,476, both of which are incorporated by reference herein, a braking force generator is known, in which the force input element extends into a recess of the primary piston and during normal operation is held inside this recess at a slight distance from a corresponding lay-on surface of the primary piston. For this purpose, a spring arrangement is used, which is held under bias by means of the actuating force booster stage. In the event of a defect of the actuating force booster stage, the spring arrangement remains ineffective. If in such a situation the driver actuates the brake, he presses down the brake pedal initially without resistance until the force input element is applied against the primary piston. A further brake pedal actuation is then transmitted to the primary piston. However, for a moment the driver has the unpleasant sensation that the brake pedal may be depressed without resistance.

BRIEF SUMMARY OF THE INVENTION

Against this background, an object of the present invention is to provide a braking force generator of the initially described type which, whilst being of a relatively simple design, during normal operation allows a complete mechanical uncoupling of force input element and primary piston and which in an emergency operating situation guarantees a rapid coupling of force input element and primary piston in order to promote a good response characteristic of the brake system.

This object is achieved by a braking force generator for a motor vehicle hydraulic brake system that is constructed with a force input element, which is connected to a brake pedal, a housing and a primary piston displaceable in the housing, wherein the primary piston together with the housing encloses a primary pressure chamber for generation of a hydraulic brake pressure, a pedal simulation device connected to the force input element, a pedal actuation detection device for detecting a pedal actuation and an actuating force booster stage for exerting an actuating force on the primary piston, wherein during normal operation the force input element is mechanically uncoupled from the primary piston and the actuating force booster stage in accordance with the detected pedal actuation exerts an actuating force on the primary piston and wherein in the event of failure of the actuating force booster stage the force input element is workingly connectable to the primary piston. In the invention, for achieving the above object it is further provided that the primary piston has a contact extension, which extends from the primary piston towards the force input element, wherein during normal operation the contact extension is held by a release gap at a distance from the force input element and in the event of failure of the actuating force booster stage the force input element after travelling the release gap is applied workingly against the contact extension.

According to the invention, it is accordingly guaranteed that during normal operation an actuation of the brake pedal is detected and the actuating force booster stage is correspondingly activated. The latter effects a displacement of the primary piston inside the housing, so that the primary piston shifts inside the housing at least to the same extent as the force input element engages into the pedal simulation device. Accordingly, during normal operation the contact extension is held permanently at a distance from the force input element, thereby guaranteeing a mechanical uncoupling of force input element and primary piston. In an emergency operating situation, in which the actuating force booster stage has failed, the primary piston moves initially for a short time under the action of the pedal simulation device in axial direction, namely precisely until the kinetic resistances compensate the forces transmitted by the pedal simulation device. Once this point is reached, the force input element approaches the contact extension counter to the resistance of the pedal simulation device and in said case travels the release gap. As soon as the release gap has been travelled by the force input element, the force input element is applied against the contact extension of the primary piston. Any further movement of the force input element to produce a braking effect is therefore transmitted directly to the contact extension and leads to an immediate movement of the primary piston inside the housing. In the emergency operating situation, the brake system accordingly responds relatively rapidly, i.e. with a relatively short delay time caused by the bridging of the release gap, so that despite failure of the actuating force booster stage the driver of the vehicle gets the feeling that the brake system is functioning reliably.

Basically, there are various possible ways of detecting a brake pedal actuation. Thus, in a development of the invention it is provided that the pedal actuation detection device is designed to detect the distance travelled by the brake pedal. Alternatively or additionally it is possible to design the pedal actuation detection device to detect the pedal actuating force exerted for the brake pedal. Both parameters, brake pedal travel and pedal actuating force, may be utilized for further control of the actuating force booster stage.

With regard to the pedal simulation device, in a development of the invention it is provided that this comprises a simulation spring arrangement, which upon a pedal actuation is compressible by the force input element. By means of such a simulation spring arrangement there is conveyed to the driver a resistance feedback that is familiar to him from conventional systems, in which the brake pedal is coupled directly to the hydraulic brake system. This feedback of a brake pedal resistance may be rendered more comfortable by designing the simulation spring arrangement with a first simulation spring and a serially connected second simulation spring, wherein the first simulation spring has a lower spring hardness than the second simulation spring and wherein there is associated with the first simulation spring a stop sleeve, which after compression of the first simulation spring by a predetermined spring excursion acts as a stop and prevents any further compression of the first simulation spring. With such a two-stage simulation spring arrangement, a progressive resistance characteristic may be conveyed to the driver. With increasing brake pedal travel he also feels a superproportionally increasing resistance, this helping him to achieve better proportioning of a pedal actuating force. In said case, it may be provided that the first simulation spring has a relatively low spring hardness and a—compared to the second simulation spring—low spring excursion. A brake pedal actuation is accordingly effected under slight resistance over a relatively small brake pedal distance up to the point, at which the stop sleeve associated with the first simulation spring acts as a stop and further compression of the first simulation spring is prevented. It is only after this point is reached that a continuation of the brake pedal actuation with increased pedal actuating force leads to a compression of the second simulation spring, now however with a steeper characteristic curve. The stop sleeve associated with the first simulation spring has the advantage that the first simulation spring during a brake pedal actuation of intensive force is not compressed to its limit and in said case destroyed.

In a development of the braking force generator according to the invention, it is provided that the simulation spring arrangement comprises a third simulation spring, which is disposed in line with the first and second simulation spring and which is of an increased spring hardness compared to the second simulation spring. This measure makes it possible to achieve a three-phase progressive spring characteristic curve, wherein the third simulation spring is compressed only upon a brake pedal actuation of very intensive force. In said case, it is in turn possible to protect the then fully compressed second simulation spring from extreme compression by means of a stop sleeve associated therewith. In general, it should be pointed out that the simulation springs may comprise either spiral springs or cup spring assemblies. It is also possible to realize the simulation spring arrangement by means of combinations of spiral springs and cup spring assemblies, for example in such a way that for the first two simulation springs spiral springs of differing spring hardness are used and for the third simulation spring a cup spring assembly of appropriate spring hardness is used.

In addition to the simulation spring arrangement, in a development of the invention the characteristic of the pedal simulation device is also influenced by means of a damper device connected to the force input element. For this purpose, it may be provided that the damper device comprises a damper housing and a damper piston guided in a fluid-proof manner in the damper housing, wherein the damper piston together with the damper housing delimits a damper chamber on each side and wherein the two damper chambers are connected to one another fluidically, in particular pneumatically, by a fluid system.

In order further to boost the damping effect of the damper device, in a development of the invention it is provided that the fluid system comprises a throttle device for throttling the flow of fluid from one damper chamber into the other damper chamber. The throttle device may optionally also be adjustable and may, where required, be adapted to various operating situations of the motor vehicle. This throttle device, in addition or alternatively to the simulation spring arrangement, makes it possible to achieve a desired resistance characteristic of the brake pedal, in particular of the type, to which the driver of a motor vehicle is accustomed from conventional hydraulic brake systems with a direct coupling of force input element and primary piston.

A development of the invention provides that the fluid system comprises a non-return valve connected in parallel to the throttle device in order to throttle the fluid flow only in one direction of flow between the damper chambers and allow the fluid flow to pass substantially unimpeded in the opposite direction of flow. This measure allows a hysteresis to be imposed on the actuating behaviour of the brake pedal. In other words, if the non-return valve upon depression of the brake pedal blocks and upon release of the brake pedal allows a substantially unthrottled fluid flow, then the brake pedal may be depressed only with a relatively high resistance. However, because of the open non-return valve the brake pedal returns relatively quickly to its starting position and allows a fresh actuation without a resetting delay.

As explained above, a brake system designed with a braking force generator according to the invention in an emergency operating situation, i.e. in the event of failure of the actuating force booster stage, responds relatively quickly because the force input element merely has to travel the release gap before being mechanically coupled directly to the contact extension and hence to the primary piston. Although the release gap is kept relatively small, in individual cases it may be advantageous to damp the application of the force input element against the contact extension and hence prevent an over-abrupt response of the brake system. To this end, it may be provided that there is disposed in the release gap between the contact extension and the force input element a spring device, in particular a cup spring assembly, which in the event of failure of the actuating force booster stage damps the application of the force input element against the contact extension. The spring device, in particular the cup spring assembly, accordingly first has to be compressed before a mechanical coupling of force input element and contact extension occurs. The spring device in said case may be connected in parallel to the simulation spring arrangement.

For the actuating force booster stage also, there are various forms of construction. One form of construction provides that the actuating force booster stage generates the actuating force hydraulically. This may be realized, for example, in that the actuating force booster stage comprises a control piston, which is guided in the housing and which together with the primary piston delimits an actuating pressure chamber that is connected or connectable to a hydraulic pressure source, wherein during normal operation by means of the actuating pressure present in the actuating pressure chamber the primary piston for generating the brake pressure is displaceable in the housing and the control piston is held stationary and wherein in the event of failure of the actuating force booster stage the control piston moves simultaneously with the primary piston. Thus, during normal operation the primary piston is displaced inside the housing relative to the control piston, which remains stationary, and therefore generates brake pressure in the hydraulic circuit of the brake system. In other words, primary piston and control piston are pressed apart from one another by the actuating pressure built up in the actuating pressure chamber. However, should the actuating force booster stage fail, with the result that there is no such displacement of the primary piston, the control piston may then move simultaneously with the primary piston upon a brake pedal actuation. Such behaviour of the control piston may be achieved, for example, by means of a stop sleeve, which during normal operation is or may be applied against a stop provided in the housing and in the emergency operating mode is liftable off said stop.

A development of the invention provides that the contact extension extends through the actuating pressure chamber and therefore reduces the hydraulic filling volume of the actuating pressure chamber. The contact extension, besides the effect—described more than once—of the relatively rapid mechanical coupling of force input element and primary piston in the emergency operating mode, accordingly has the additional effect that during normal operation, when the actuating force booster stage is fully functional, it reduces the effective area for a pressure build-up in the actuating pressure chamber and hence reduces the hydraulic filling volume of the actuating pressure chamber. This admittedly results in the hydraulic pressure source having to supply an increased hydraulic pressure in order to ensure an adequate effect of the actuating force booster stage, however for displacement of the primary piston a smaller hydraulic fluid volume is required, which ultimately leads to an improved response characteristic.

With regard to the constructional arrangement of control piston and contact extension, in a development of the invention it is provided that the control piston has a central through-opening, through which the contact extension extends in a sealingly guided manner. The control piston accordingly, besides its function as the actuating force booster stage, additionally performs a guide function for guidance of the relatively long contact extension and hence for guidance of the primary piston.

For control of the actuating force booster stage, it may be provided that the hydraulic pressure source comprises a hydraulic valve unit that is activatable in accordance with the pedal actuation. It may further be provided that the hydraulic pressure source comprises a hydraulic pump, a pressure limiter and an accumulator.

As an alternative to hydraulic generation of the actuating force, one form of construction of the invention provides that the actuating force booster stage generates the actuating force pneumatically. This may be achieved, for example, in that the actuating force booster stage comprises a first and a second movable wall, which are displaceable in a closed housing, wherein the first movable wall together with the housing delimits a first vacuum chamber and together with the second movable wall delimits a working chamber and the second movable wall together with the housing delimits a second vacuum chamber, wherein moreover the first movable wall is coupled to the brake pedal and the second movable wall is coupled to the contact extension, wherein moreover the two vacuum chambers are evacuable by means of a pneumatic valve and the working chamber is connectable by the pneumatic valve in accordance with the pedal actuation to the ambient atmosphere or to a pressure source for generating a differential pressure relative to the vacuum chambers, wherein during normal operation by means of the pressure above atmospheric prevailing in the working chamber the second movable wall for generating the brake pressure is displaceable in the housing and the first movable wall is held stationary and wherein in the event of failure of the actuating force booster stage the first movable wall approaches the second movable wall and moves simultaneously with the primary piston.

In this variant of the invention, the hydraulic actuating force booster stage is consequently replaced by a kind of differential pressure brake booster, in which the force input element during normal operation is completely uncoupled from the primary piston but in the emergency operating state, i.e. in the event of failure of the actuating force booster stage, is connectable relatively quickly to the primary piston.

In a further variant of the invention, the braking force generator comprises a secondary piston, which is displaceable in the housing and which together with the housing encloses a secondary pressure chamber for generation of a hydraulic brake pressure. The provision of a secondary piston in addition to the primary piston increases the reliability of the hydraulic brake system because hydraulic brake pressure is therefore generated by means of two pressure chambers and then acts upon vehicle brake units at the respective wheels that are to be braked.

The invention further relates to a motor vehicle hydraulic brake system that is constructed with a braking force generator of the previously described type.

Other advantages of this invention will become apparent to those skilled in the art from the following detailed description of the preferred embodiment, when read in light of the accompanying drawings.

DETAILED DESCRIPTION OF THE INVENTION

Figure 1:
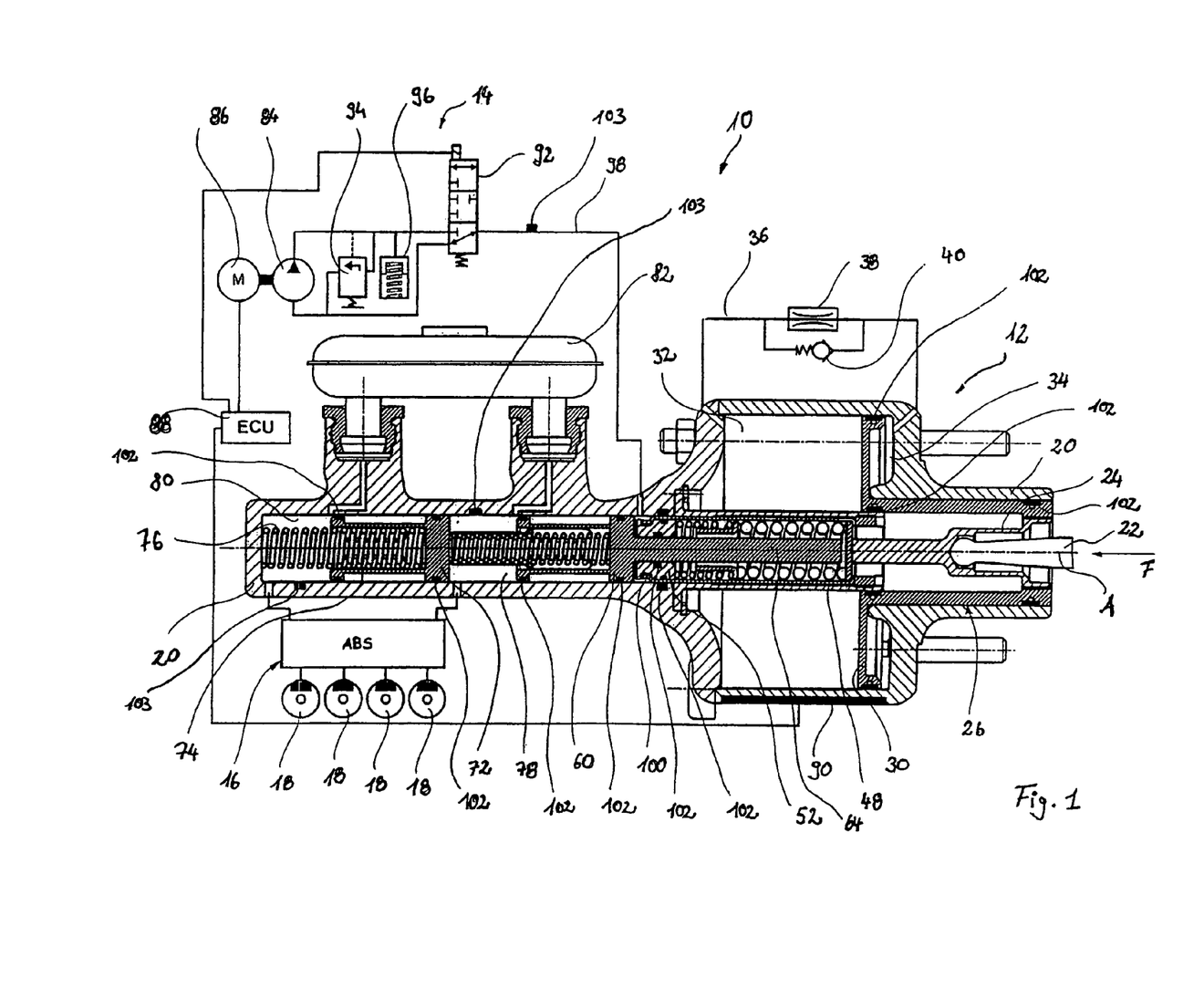
FIG. 1 a schematic view of a hydraulic brake system with a first embodiment of a braking force generator according to the invention.

In FIG. 1 a motor vehicle brake system according to the invention is denoted generally and by 10. It comprises a braking force generator 12, which is shown separately from the remaining components to an enlarged scale in FIG. 2.

The motor vehicle brake system 10, in addition to the braking force generator 12, comprises a hydraulic pressure source 14, as well as a hydraulic brake system 16, by means of which brake units 18 disposed at each wheel of the motor vehicle that is to be braked are activated in an as such known manner.

Figure 2:
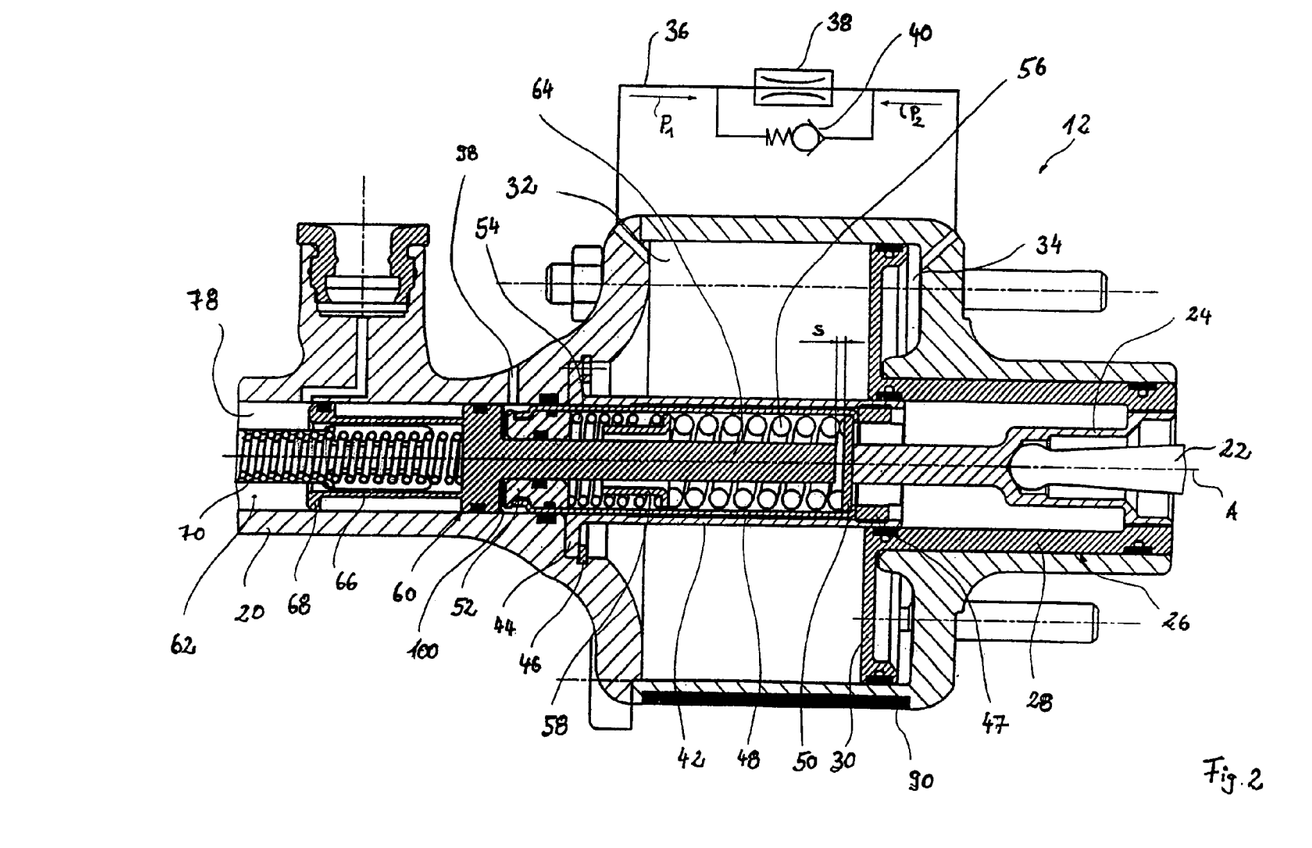
FIG. 2 an enlarged representation of the braking force generator according to the invention in accordance with FIG. 1.

The braking force generator comprises a housing 20, into which projects a force input element 22, which is connected to a vehicle brake pedal not shown in FIGS. 1 and 2. The force input element 22 is accommodated in a tappet 24, which for joint movement is connected by a threaded connection to a damper piston 26 guided in the housing 20. The damper piston 26 comprises a piston shank 28 guided in the housing 20 as well as a piston disk 30 rigidly connected to the piston shank 28. The piston disk 30 is guided displaceably in a bellied cylindrical region of the housing 20 and together with the housing 20 encloses a damper chamber 32 and 34 on each side. The two damper chambers 32 and 34 are connected fluidically to one another by a pneumatic fluid system 36, wherein the fluid system 36 has a throttle device 38 and a non-return valve 40 connected in parallel to the throttle device 38.

The tappet 24 extends in a hollow-cylindrical guide bush 42, which at its end remote from the tappet 24 is fastened by a flange 44 and a locking ring 46 in the housing 20. The guide bush 42 at its end remote from the flange 44 has an internal thread, into which an externally threaded ring 47 is screwed. The externally threaded ring 47 acts as a stop for a connection sleeve 48, which is accommodated displaceably in the guide bush 42 and in the housing 20. The connection sleeve 48 guides in the direction of the axis A a pressure plate 50, which is in abutment with the tappet 24. At its opposite end, the connection sleeve 48 is connected in a fixed manner to an annular control piston 52. The connection sleeve 48 accommodates between the control piston 52 and the pressure plate 50 a first simulation spring 54 and a second simulation spring 56 serially connected thereto. The two simulation springs 54 and 56 are separated from one another by the flange of a stop sleeve 58 and lie against both sides of said flange. The shank of the stop sleeve 58 extends in axial direction through the simulation spring 54 towards the control piston 52.

Provided adjacent to the control piston 52 is a primary piston 60, which like the connection sleeve 48 is guided axially in a bore 62 in the housing 20. Extending from, and rigidly connected to, the primary piston 60 is a contact extension 64. The contact extension 64 extends to a point just in front of the pressure plate 50, with the result that a release gap s arises between the pressure plate 50 and the free end of the contact extension 64. The contact extension 64 extends through a central bore inside the control piston 52.

On the primary piston 60 a hollow-cylindrical receiving portion 66 is further provided, which at its free end has a flange 68 guided in the axial bore 62. In the receiving portion 66 a first restoring spring 70 is accommodated. It is supported by one end against the primary piston 60. By its other end the restoring spring 70 is supported against a secondary piston 72. The secondary piston 72 further comprises an axially extending hollow-cylindrical receiving portion 74, which likewise accommodates a restoring spring 76.

The restoring spring 76 is supported by one end against the secondary piston 72 and by the other end against the end face of the housing 20. The primary piston 60 together with the secondary piston 72 encloses a primary pressure chamber 78. The secondary piston 72 together with the housing 20 encloses a secondary pressure chamber 80. The primary pressure chamber 78 and the secondary pressure chamber 80 are connected in a conventional manner to a hydraulic fluid tank 82 as well as to the hydraulic brake system 16.

Turning to the hydraulic pressure source 14, the following should be noted: the hydraulic pressure source 14 comprises a pump 84, which is driven by means of a motor 86. The motor 86 is controlled by an electronic control unit 88. Control is effected in accordance with the position of the piston disk 30 inside the housing 20. The position of the piston disk 30 inside the housing 20 is detected by means of a displacement sensor 90 that is fitted to the outside of the housing 20 in the bellied region thereof. The displacement sensor 90 operates, for example, magnetically. The hydraulic pressure source 14 additionally comprises a pressure limiting valve 94 which, in the event of too high a pressure being generated by the pump 84, fluidically short-circuits the pump. The hydraulic pressure source 14 further comprises an accumulator 96. The hydraulic pressure source 14 is fluidically connected by a line 98 to an actuating pressure chamber 100. It should be pointed out that the control valve 92 is controlled likewise by the electronic control unit 88.

For fluid-proof guidance, the components that are movable relative to one another and relative to the housing 20 each have sealing rings 102. Pressure sensors 103 are further provided at various points of the system according to the invention, for example in the line 98, the primary pressure chamber 78 and the secondary pressure chamber 80. By means of these pressure sensors 103 it is possible to monitor the system and, where necessary, initiate an emergency operating mode, for example in the event of failure of the hydraulic pressure source 14.

The motor vehicle brake system 10 having the braking force generator 12 according to the invention operates as follows. During normal operation, actuation of a non-illustrated brake pedal leads to a pedal actuating force F being exerted on the force input element 22. This force presses the force input element 22 in the direction of the axis A into the housing 20 and at the same time displaces the tappet 24 and, together with it, the damper piston 26 inside the housing 20. A movement of the piston disk 30 is detected by the displacement sensor 90 and signalled to the electronic control unit 88. It correspondingly activates the motor 86 and hence the pump 84, which at the same time builds up a hydraulic pressure. This hydraulic pressure is stored in the accumulator 96. The control valve 92 consequently switches from the bottom valve position shown in FIG. 1 via the middle valve position to the top valve position, so that the hydraulic pressure stored in the accumulator 96 builds up in the line 98 and is introduced from there into the actuating pressure chamber 100. This leads to the build-up of a corresponding hydraulic pressure in the actuating pressure chamber 100. This pressure acts, on the one hand, upon the control piston 52 and, on the other hand, upon the primary piston 60. The control piston 52 is however supported via the connection sleeve 84 against the stop 47, thereby preventing a movement of the control piston 52 in axial direction in FIG. 1 to the right. The primary piston 60 alone is displaceable, under the actuating pressure built up in the actuating pressure chamber 100, in axial direction in FIGS. 1 and 2 in each case to the left and therefore builds up in the primary pressure chamber 78 and in the secondary chamber 80 a hydraulic pressure that is then passed on to the hydraulic brake system 16. As a result of the movement of the primary piston 60, the contact extension 64 is also moved simultaneously with this primary piston 60, i.e. the contact extension 64 moves likewise in FIGS. 1 and 2 to the left. The movement of the contact extension 64 together with the primary piston 60 occurs with a stroke in axial direction that is at least as great as the displacement of the force input element 22 and tappet 24 that is brought about by the actuation of the brake pedal. This means that the pressure plate 50 that moves simultaneously with the tappet 24—if one disregards a first reaction time on account of the inertia of the system—does not approach the contact extension 64 and during normal operation, i.e. when all of the components of the system are functioning properly, also does not come into abutment with the contact extension 64. Rather, because of the movement of the primary piston 60 caused by the actuating pressure the contact extension 64 moves to a greater extent in axial direction, with the result that the release gap s shown in FIG. 2 during normal operation upon an actuation of the brake pedal is more likely to increase in size but in any case does not decrease in size in such a way that a permanent contact between the contact extension 64 and the pressure plate 50 occurs.

It should be pointed out that the movement executed by the components: force input element 22, tappet 24 and throttle piston 26 is subject to various forms of damping. On the one hand, by means of the pressure plate 50 the simulation springs 54 and 56 are successively compressed. This occurs in such a way that first the simulation spring 54 is compressed until the stop sleeve 58 is applied against the control piston 54. Further compression of the non-rigid simulation spring 54 is then no longer possible. If, because of a pedal actuation of intensive force, the pressure plate 50 is displaced further, the harder simulation spring 56 is then compressed. It should however be pointed out once more that even in the event of extensive compression of the simulation spring 56, given proper operation of the pressure source 14, no permanent contact is established between the contact extension 64 and the pressure plate 50. As a result of the successive compression of the two simulation springs 54 and 56, a driver of the motor vehicle experiences a progressive characteristic of the resistance at the brake pedal. The brake pedal may be depressed initially with relatively little resistance, namely for as long as the simulation spring 54 is compressible. As soon as the stop sleeve 58 lies against the control piston 52, however, the resistance characteristic curve becomes steeper and the driver from then on has to apply a higher force in order to press the brake pedal further down.

Besides the resistance generated by the simulation springs 54 and 56, the displacement of the piston disk 30 inside the housing 20 leads to a variation of the volumes of the damper chambers 32 and 34. If, namely, upon a pedal actuation the piston disk 30 is displaced inside the housing 20 in the embodiment shown in FIGS. 1 and 2 axially to the left, then the damper chamber 32 is reduced and the damper chamber 34 increased in size. This leads to the development of a pressure above atmospheric in the damper chamber 32 and of a vacuum in the damper chamber 34. This pressure difference is compensated by the fluid system 36 in that, because of the growing vacuum in the damper chamber 34, air is sucked out of the damper chamber 32 by the fluid system 36 in accordance with arrow $P_1$. Given such an air flow in accordance with $P_1$, the non-return valve 40 closes automatically, so that the air has to flow through the throttle device 38 and in said case the flow is throttled. By virtue of this throttle effect a displacement of the piston disk 30 inside the housing 20 is braked, thereby further increasing the resistance at the brake pedal in addition to the resistance summoned up by the simulation springs 54 and 56.

When the pedal is released, the springs in the system act in a restoring manner upon the brake pedal, with the result that the piston disk 30 returns to the starting position shown in FIGS. 1 and 2. As a result, air is pressed out of the damper chamber 34 through the fluid system 36 into the damper chamber 32 in accordance with arrow $P_2$. Such an air flow automatically opens the non-return valve, so that the air may flow substantially unimpeded through the fluid system 36 into the damper chamber 32. In other words, the fluid system 36 during such a restoring movement does not have a damping effect. On the whole, by means of the fluid system 36 in combination with the damper chambers 32 and 34 and the piston disk 30 it is possible to impose on the brake pedal behaviour a hysteresis that enables a damped deflection and an undamped restoring movement of the brake pedal.

If, e.g. as a result of a partial power failure inside the vehicle or a defect of at least one of the components, the hydraulic pressure source 14 fails, it is then no longer possible to generate a braking force by means of a hydraulic pressure built up in the actuating chamber 100. Nevertheless, reliable operation of the brake system 10 is to be guaranteed. This is effected according to the invention in that, in the case of an actuation of the brake pedal with the force F and a deflection of the force input element 22 together with the tappet 24, the pressure plate 50 is displaced in FIGS. 1 and 2 to the left. Because of the failure of the hydraulic pressure source 14, despite a deflection of the piston disk 30 out of the position shown in FIGS. 1 and 2 a displacement of the primary piston 60 by means of an actuating pressure built up in the actuating pressure chamber 100 does not occur. The primary piston 60 therefore initially moves solely under the action of the simulation springs 54 and 56 in axial direction. During this movement of the primary piston 60, kinetic resistances and counterforces originating from the primary pressure chamber 78, e.g. from the restoring spring 70, have to be overcome. As soon as these counterforces lead to a compressing of the first simulation spring 54, the contact extension 64 approaches and is finally applied against the pressure plate 50. The primary piston 60 then moves under the action of the force F together with the control piston 52, the connection sleeve 48 fastened thereto as well as the simulation springs 54 and 56 held therein in axial direction in FIGS. 1 and 2 to the left. This leads to the generation in the primary pressure chamber 78 and the secondary pressure chamber 80 of a brake pressure that is passed on to the brake system 16. FIGS. 1 and 2 reveal that a direct mechanical connection of pressure plate 50, force input element 22 as well as contact extension 64 and hence primary piston 60 occurs relatively quickly, namely after bridging of the release gap s by the pressure plate 50. Accordingly, in the event of failure of the pressure source 14, i.e. in an emergency operating situation, the brake system responds relatively rapidly because only the release gap s has to be bridged, during which process hardly any braking effect is achieved.

Figure 3:
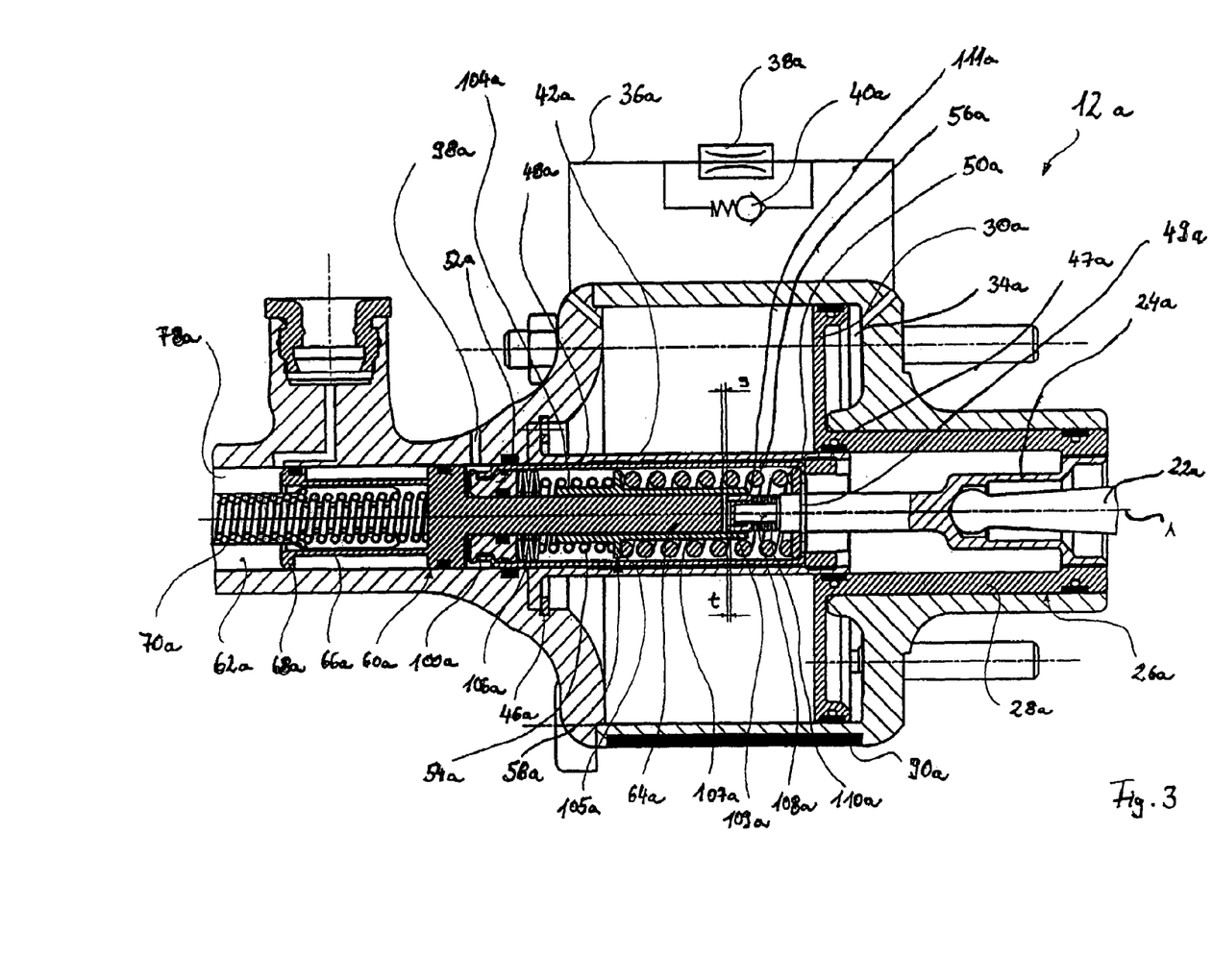
FIG. 3 a second embodiment of a braking force generator according to the invention and FIG. 4 a schematic representation of a third embodiment of a braking force generator according to the invention.

FIG. 3 shows a view similar to FIG. 2 of a second embodiment of the braking force generator according to the invention. To avoid repetition, only the differences from the first embodiment according to FIGS. 1 and 2 will be described. For components of an identical type or identical effect the same reference characters as in the description of FIGS. 1 and 2 are used, only followed by the letter "a".

The second embodiment according to FIG. 3 differs from the first embodiment according to FIGS. 1 and 2 in that the first simulation spring 54a lies not directly against the control piston 52a but against a cup spring arrangement 106a, which comprises four cup springs. The cup springs of the cup spring arrangement 106a lie with their end remote from the simulation spring 54a against the control piston 52a. They are designed in such a way that upon compression of the first simulation spring 54a they may come into contact with the portion 104a of the stop sleeve 58a facing them and may then be compressed by this portion without further compression of the first simulation spring 54a. The stop sleeve 58a has a collar 105a, against which the end of the first simulation spring 54a remote from the cup springs lies. Extending from the collar 105a is a tubular region 107a. The second simulation spring 56a is slipped onto this region 107a. A further displacement of the force input element 22a in the direction of the axis A to the left leads—after the first simulation spring 54a has already been compressed in accordance with the above description up to mutual abutment of the region 104a and the cup spring assembly 106a—to further compression of the spring arrangement, namely to compression of the second simulation spring 56a. This may be compressed until the free end of the tubular portion 107a of the stop sleeve 58a lies against the pressure plate 50a. Once this state is reached, further compression of the second simulation spring 56a is also impossible and further axial displacement of the force input element 22a leads finally via the stop sleeve 58a to compression of the cup spring arrangement 106a. It should be noted that force is transmitted between the tappet 24a and the compression spring 50a by a locking ring 49a.

The effect achievable by this constructional measure is that the simulation spring arrangement disposed in the connection sleeve 48a presents a progressive spring characteristic curve with three different slopes, namely a relatively flat initial slope on account of the spring characteristic curve of the first simulation spring 54a, a steeper characteristic curve portion on account of the second simulation spring 56a, which is compressed when the stop sleeve 58a lies against the cup spring arrangement 106a, and finally an even steeper characteristic curve portion on account of the stiff cup spring arrangement 106a, the spring hardness of which is increased further compared to the spring hardness of the second simulation spring 56a. The effect achievable thereby is that, even in the event of a brake pedal actuation of intensive force by the driver, the driver senses a growing resistance to a brake pedal actuation.

The second embodiment according to FIG. 3 moreover shows a connection of the tappet 24a to the contact extension 64a that is modified compared to FIG. 2. The tappet 24a at its, in FIG. 3, left end has a pin 108a, onto which a cup spring assembly 110a is mounted. At its free end the tappet is provided with a locking bush 109a, which is fixed thereon and limits the axial displaceability of a stop bush 111a mounted displaceably on the tappet 108a. The stop bush 111a projects axially beyond the locking bush 109a.

The arrangement in the region of the free end of the tappet 24a operates as follows. During normal operation, the stop bush 111a is held with its left end, as already described more than once, at a distance from the contact extension 64a, namely in such a way that the release gap s is maintained. This is effected by a corresponding pressure build-up in the actuating chamber 100a. However, if such a pressure build-up is not possible, e.g. as a result of an electronics- or leakage-related failure of the hydraulic pressure source 14 according to FIG. 1, then a displacement of the force input element 22a in FIG. 3 to the left does not lead to a corresponding pressure build-up in the actuating chamber 100a and hence to a displacement of the primary piston 60a. Rather, the primary piston 60a moves solely under the action of the simulation springs 54a, 56a, 106a out of its position according to FIG. 3, while the force input element 22a moves in FIG. 3 to the left. Because of increasing counterforces the first simulation spring 54a is compressed, wherein the stop bush 111a approaches, and is applied against, the contact extension 64a. As soon as this occurs and the force input element 22a is pushed further in FIG. 3 to the left, a relative movement occurs between the stop sleeve 111a and the pin 108a together with the locking sleeve 109a thereof. During this relative movement the cup spring arrangement 110a is compressed. The maximum travel of such a compression is denoted in FIG. 3 by the letter t. For, as soon as the locking sleeve 109a is applied against the contact extension 64a, an axial movement of the force input element 22a is transmitted directly to the contact extension 64a without further compression of the cup spring assembly 110a being able to occur.

By virtue of this measure in the region of the free end of the tappet 24a, the driver of the vehicle in an emergency operating situation does not sense any abrupt increase of the resistance.

Figure 4:
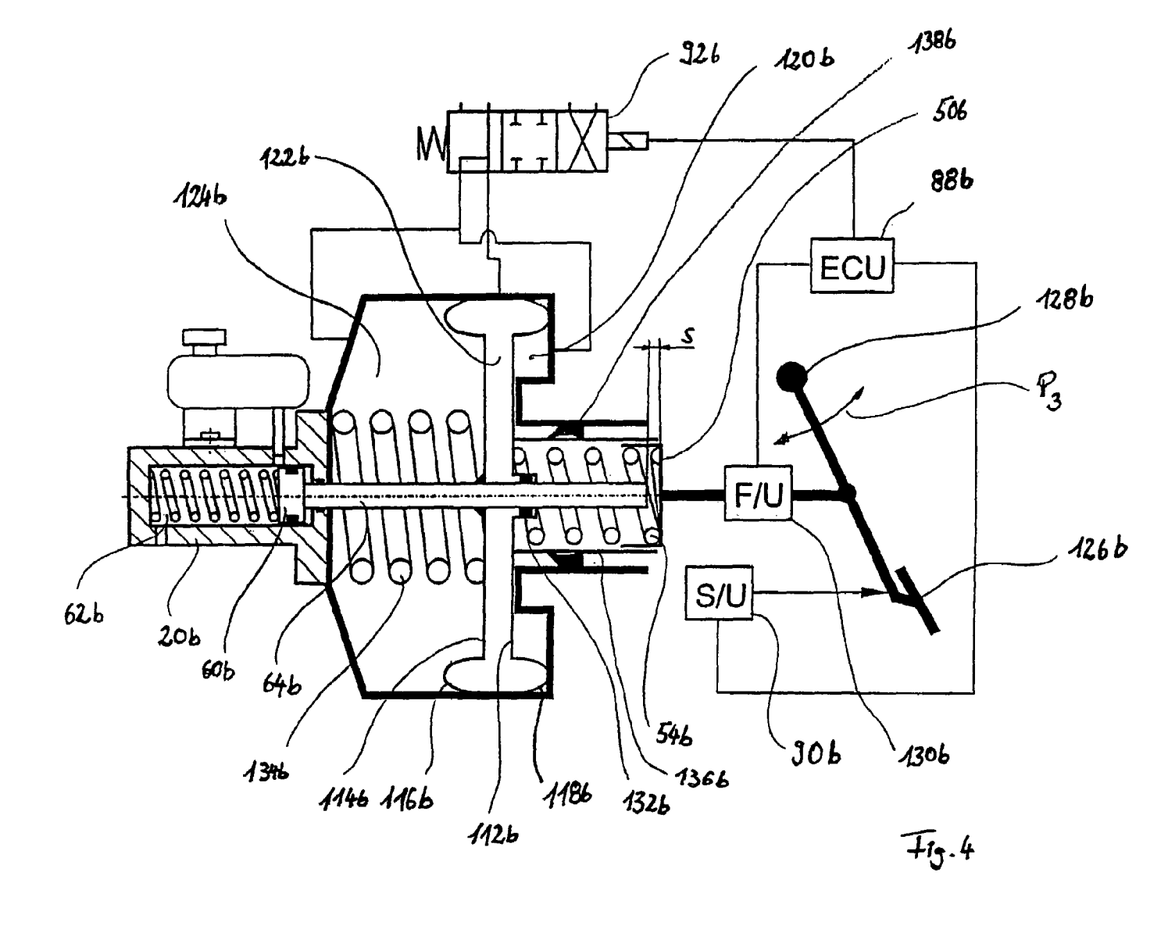

FIG. 4 shows a third embodiment of the braking force generator according to the invention, however only in a schematic representation. Once more, for components of an identical type or identical effect the same reference characters as for the description of the first two embodiments are used, only followed by the letter "b".

In contrast to the first two embodiments, the braking force generator 12b has, not a hydraulic actuating force booster stage, but a pneumatically actuated actuating force booster stage. This comprises two walls 112b and 114b, which are movable in the screened housing and attached flexibly to the housing 20b by means of bellows-type seals 116b and 118b. The movable wall 112b together with the housing 20b encloses a first vacuum chamber 120b. Between the movable wall 112b and the movable wall 114b a working chamber 122b is delimited. Finally, the movable wall 114b together with the housing encloses a second vacuum chamber 124b. By means of the control valve 92b the two vacuum chambers 120b and 124b are evacuable, for example, in that they are connected to the intake tract of an internal combustion engine and so a vacuum is built up in the two vacuum chambers 120b and 124b. The working chamber 122b, on the other hand, is connectable to the ambient atmosphere or to a non-illustrated pressure source, so that in this working chamber a differential pressure, in particular a pressure above that of the vacuum chamber 120b and 124b may be built up. By virtue of a variation of the position of the control valve 92b, controlled by the electronic control unit 88b, the vacuum chambers 122b and 124b may be short-circuited with the working chamber 122b, so that there is then approximately pressure equality. It is moreover possible for the working chamber 122b, on completion of pressure equalization with the vacuum chambers 120b and 124b, to be completely isolated from them.

FIG. 4 further shows a brake pedal 126b, which is pivotable about a pivot point 128b in accordance with arrow $P_3$. For detecting the brake pedal actuation, the displacement sensor 90b and a force sensor 130b are provided.

The contact extension 64b extends in this embodiment from the primary piston 60b through the vacuum chamber 124b, the working chamber 122b and the vacuum chamber 120b. The movable wall 114b is fixed on the contact extension 64b. The movable wall 112b, on the other hand, is guided displaceably on the contact extension 64b and sealed by means of a seal 132b. The movable wall 114b is biased into its position shown in FIG. 4 by means of a spring 134b.

A simulation spring 54b is moreover accommodated in a receiving bush 136b, which is fitted in a fixed manner on the movable wall 112b. The simulation spring 54b is supported by its one end against the movable wall 112b. By its other end the simulation spring 54b is supported against a pressure plate 50b. The receiving bush 136b is sealed off by sealing means 138b and guided displaceably in the housing 20b.

Upon a brake pedal actuation, this actuation is detected by the displacement sensor 90b and the force sensor 130b and transmitted in a parameterized manner to the electronic control unit 88b. During normal operation, i.e. when the entire system is operating properly, the electronic control unit switches the control valve 92b into the right operating position, in which the two vacuum chambers 120b and 124b are evacuated and the working chamber 122b is connected to the ambient atmosphere. This leads to a higher pressure in the working chamber 122b than in the vacuum chambers 120b and 124b, wherein the two movable walls 112b and 114b are pressed apart from one another. However, as the movable wall 112b is already in abutment with the housing 20b, the movable wall 114b has to yield in FIG. 4 to the left, with simultaneous compression of the spring 134b. In said case, the spring via the contact extension 64b presses the primary piston 60b in FIG. 4 to the left, with the result that in a manner known as such and described with reference to FIGS. 1 to 3 a hydraulic brake pressure is generated in the primary pressure chamber 62b.

However, in the event of failure of the actuating force booster stage, for example because of failure of the control valve 92b, the electronic control unit 88b or the like, it is impossible to achieve a displacement of the primary piston 60b by means of a pressure-induced movement of the wall 114b. In this case, there is pressure equality in all three chambers 120b, 122b and 124b. Upon an actuation of the brake pedal 126b, therefore, the pressure plate 50b is displaced in accordance with the pedal actuation until it has moved, with simultaneous compression of the simulation spring 54b, over the distance s towards the contact extension 64b and has been applied against it. The pedal actuating force is then transmitted directly to the contact extension 64b of the primary piston 60b and displaces the primary piston inside the housing 20b. This displacement of the primary piston leads to a build-up of a hydraulic pressure in the brake system. Once more, the relatively narrow release gap of the width s has to be travelled before a pedal actuation is achieved.

It should be pointed out that the previous embodiments are not a definitive description of the invention but rather show individual forms of construction that may optionally also be combined with one another. Thus, for example, a multi-stage simulation spring arrangement may also be provided in the third embodiment according to FIG. 4.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Braking force generator for a motor vehicle hydraulic brake system comprising
  a force input element, which is connected to the brake pedal,
  a housing and a primary piston displaceable in the housing, wherein the primary piston together with the housing encloses a primary pressure chamber for generation of a hydraulic brake pressure,
  a pedal simulation device connected to the force input element,
  a pedal actuation detection device for detecting the pedal actuation and an actuating force booster stage for exerting an actuating force on the primary piston,
  wherein the pedal simulation device comprises a simulation spring arrangement, which upon a pedal actuation is compressible by the force input element,
  wherein during normal operation the force input element is mechanically uncoupled from the primary piston and the actuating force booster stage in accordance with the detected pedal actuation exerts an actuating force on the primary piston, and
  wherein in the event of failure of the actuating force booster stage the force input element is workingly connectable to the primary piston,
  wherein a contact extension extends from the primary piston towards the force input element,
  wherein during normal operation the contact extension is held by a release gap at a distance from the force input element and in the event of failure of the actuating force booster stage the force input element after travelling the release gap is applied workingly against the contact extension and that the simulation spring arrangement is constructed with a first simulation spring and a serially connected second simulation spring, wherein the first simulation spring has a lower spring hardness than the second simulation spring.

2. Braking force generator according to claim 1, wherein the pedal actuation detection device is designed to detect the distance travelled by the brake pedal.

3. Braking force generator according to claim 1, wherein the pedal actuation detection device is designed to detect the pedal actuating force exerted on the brake pedal.

4. Braking force generator according to claim 1, wherein there is associated with the first simulation spring a stop sleeve, which after compression of the first simulation spring by a predetermined spring excursion acts as a stop and prevents a further compression of the first simulation spring.

5. Braking force generator according to claim 1, wherein the simulation spring arrangement comprises a third simulation spring, which is disposed in line with the first and second simulation spring and which is of an increased spring hardness compared to the second simulation spring.

6. Braking force generator according to claim 1, wherein the pedal simulation device comprises a damper device connected to the force input element.

7. Braking force generator according to claim 6, wherein the damper device comprises a damper housing and a damper piston guided in a fluid-proof manner in the damper housing, wherein the damper piston together with the damper housing defines first and second chambers on each side and wherein the first and second damper chambers are connected to one another fluidically by a fluid system.

8. Braking force generator according to claim 7, wherein the fluid system comprises a throttle device for throttling the flow of fluid from the first damper chamber (32; 32a) to the second damper chamber.

9. Braking force generator according to claim 8, wherein the fluid system comprises a non-return valve connected in parallel to the throttle device in order to throttle the fluid flow only in one direction of flow between the first and second damper chambers and to allow the fluid flow to pass substantially unimpeded in the opposite direction of flow.

10. Braking force generator according to claim 7, wherein the first and second damper chambers are selectively connected to one another by a pneumatic fluid system.

11. Braking force generator according to claim 1, wherein in the release gap between the contact extension and the force input element a spring device, is disposed, which in the event of failure of the actuating force booster stage damps the application of the force input element against the contact extension.

12. Braking force generator according to claim 11, in combination with a motor vehicle hydraulic system comprising:
a hydraulic pressure source;
a plurality of brake units selectively in communication with the braking force generator; and
a hydraulic brake system connecting the hydraulic pressure source to the plurality of brake units.

13. Braking force generator according to claim 11, wherein the spring device is a cup spring assembly.

14. Braking force generator according to claim 1, wherein the actuating force booster stage generates the actuating force hydraulically.

15. Braking force generator according to claim 14, wherein the actuating force booster stage comprises a control piston, which is guided in the housing and which together with the primary piston delimits an actuating pressure chamber connectable to a hydraulic pressure source,
wherein during normal operation by means of the actuating pressure present in the actuating pressure chamber the primary pressure piston for generation of the brake pressure is displaceable in the housing and the control piston is held stationary and wherein in the event of failure of the actuating force booster stage the control piston moves simultaneously with the primary pressure piston.

16. Braking force generator according to claim 15, wherein the control piston lies via a stop sleeve against a stop provided in the housing.

17. Braking force generator according to claim 15, wherein the contact extension extends through the actuating pressure chamber and therefore reduces the hydraulic filling volume of the actuating pressure chamber.

18. Braking force generator according to claim 15, wherein the control piston has a central through-opening, through which the contact extension extends in a sealingly guided manner.

19. Braking force generator according to claim 15, wherein the hydraulic pressure source comprises a hydraulic valve unit, which is activatable in accordance with the pedal actuation.

20. Braking force generator according to claim 15, wherein the hydraulic pressure source comprises a hydraulic pump, a pressure limiter and an accumulator.

21. Braking force generator according to claim 1, wherein the actuating force booster stage generates the actuating force pneumatically.

22. Braking force generator according to claim 21, wherein the actuating force booster stage comprises a first and a second movable wall, which are displaceable in a closed housing, wherein the first movable wall together with the housing delimits a first vacuum chamber and together with the second movable wall delimits a working chamber and the second movable wall together with the housing delimits a second vacuum chamber, wherein moreover the first movable wall is connected to the brake pedal and the second movable wall is connected to the contact extension, wherein moreover the first and second vacuum chambers are evacuable by means of a pneumatic valve unit and the working chamber is connectable by the pneumatic valve unit in accordance with the pedal actuation to one of the ambient atmosphere and a pressure source for generation of a differential pressure compared to the first and second vacuum chambers, wherein during normal operation by means of the differential pressure present in the working chamber the second movable wall for generating the brake pressure is displaceable in the housing and the first movable wall is held stationary and wherein in the event of failure of the actuating force booster stage the first movable wall approaches the second movable wall and moves simultaneously with the primary pressure piston.

23. Braking force generator according to claim 1, including a secondary piston, which is displaceable in the housing and which together with the housing encloses a secondary pressure chamber for generating a hydraulic brake pressure.

* * * * *